Jan. 14, 1964  R. W. REICH  3,118,098
OSCILLATING DRIVE ELECTROMAGNETIC MOTOR SYSTEM
Filed June 6, 1958
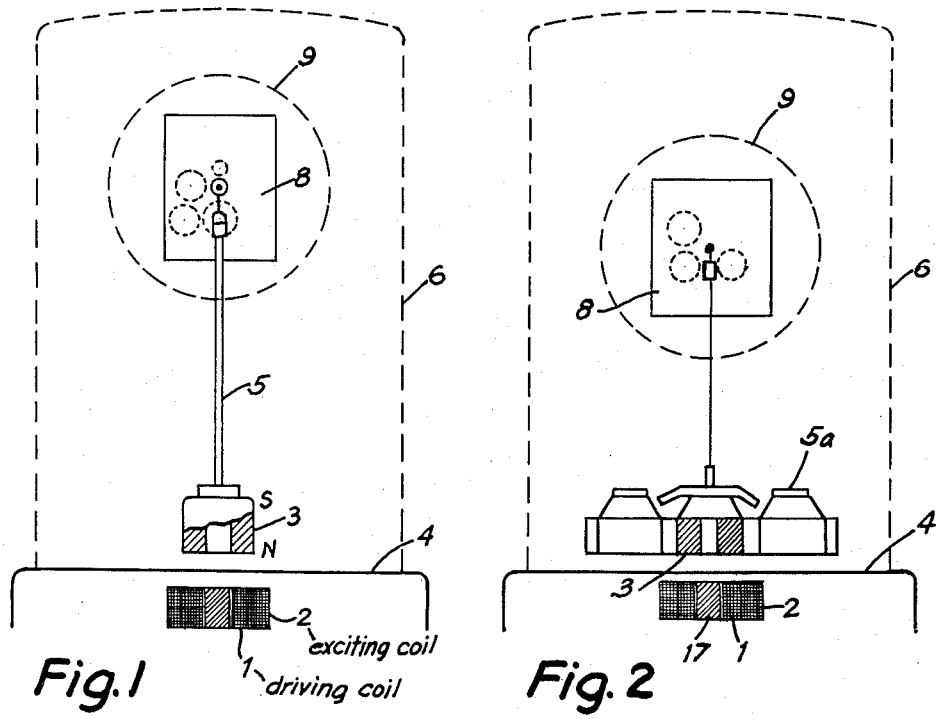
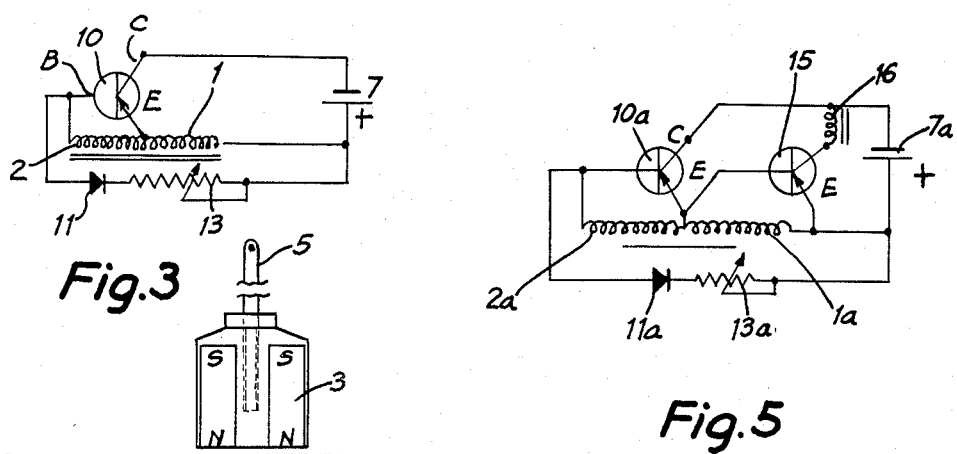
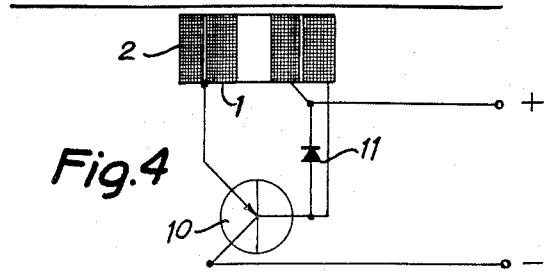
INVENTOR
ROBERT WALTER REICH
BY Toulmin & Toulmin
ATTORNEYS United States Patent Office 3,118,098
Patented Jan. 14, 1964

3,118,098
OSCILLATING DRIVE ELECTROMAGNETIC MOTOR SYSTEM
Robert Walter Reich, Freiburg im Breisgau, Germany, assignor to Jahresuhren-Fabrik G.m.b.H., Aug. Schatz & Söhne, Triberg, Black Forest, Germany
Filed June 6, 1958, Ser. No. 740,490
Claims priority, application Germany June 7, 1957
9 Claims. (Cl. 318—128)

The present invention relates to electronic clocks. More in particular, the present invention relates to an impelling system for electronic pendulum clocks.

It is known to construct electronic clocks the impelling system of which comprises separate exciting and driving coils. These constructions call for the use of bar magnets entering into the coils. An impulse produced in the exciting coil is amplified by a transistor and then used as a driving impulse in the driving coil.

This construction is undesirable and suffers from a number of disadvantages. The coils must have a certain minimum size for producing the exciting impulse and the impulse for driving the pendulum. The coils cannot be entirely covered as the bar magnets must be allowed to enter the coils. A very delicate and difficult adjustment is required in order to prevent excessive oscillations of the pendulum and the assembly of the individual clocks is thus very complicated and time-consuming. It is a further disadvantage that the driving impulse impels the pendulum in one direction only, the motion of the pendulum in the other direction being the result of free oscillation. Only after the end of this free oscillation and upon reversal of the pendulum the exciting coil produces the necessary impulse for controlling the driving coil. The two coils have to be separate as their coupling would result in a self-excited oscillation of the system in view of the fact that the driving coil must be disposed in the emitter or collector circuit of the transistor and the exciting coil must be provided between the base and the emitter. This stops the further operation of the clock and the exciting and driving impulses cannot perform their desired functions.

Although this danger is avoided in the known constructions with separate coils there is yet another disadvantage resulting from the fact that the exciting coils have a small cross section of the wire but a great number of windings and therefore a very high D.C. resistance in the order of several thousand ohms. As this resistance is arranged between the emitter and the base of the transistor it produces a negative voltage at the base which, in turn, results in a permanent current which is at least equal to the necessary driving current. The total current consumption of the impelling system is therefore quite considerable and renders the entire electronic clock uneconomical in operation. A conventional dry cell battery will have to be replaced after a very short period of operation, although only a small fraction of the current consumption has actually been used for producing the driving impulses which are effective for very short intervals only.

It is an object of the present invention to provide an impelling system for electronic pendulum clocks, which operates extremely accurately without requiring a difficult adjustment of the exciting and driving coils.

It is another object of the present invention to provide an impelling system for electronic pendulum clocks, whereby the pendulum is impelled and controlled in either one of its two senses of motion.

It is a further object of the present invention to provide an impelling system for electronic pendulum clocks, in which only the current used for creating the exciting and driving impulses is consumed and in which the current consumption is therefore greatly reduced.

It is still another object of the present invention to provide an impelling system for electronic pendulum clocks, in which a self-excited oscillation of the impelling system is prevented by simple and effective means.

It is yet another object of the present invention to provide an impelling system for electronic pendulum clocks, whose elements are adapted to be so disposed that the clock casing may have a pleasant appearance, and that the clock can be easily assembled as well as repaired.

It is a further object of the present invention to provide an impelling system for electronic pendulum clocks, which is self-starting.

These objects as well as further objects and advantages which will become apparent as the description of the invention proceeds are achieved by the impelling system for electronic pendulum clocks of the present invention, comprising a current source, a pendulum, a permanent magnet, and a driving coil and a transistor, and in which the permanent magnet is mounted at the lowermost end of the pendulum, polarized in the direction of the longitudinal axis of the pendulum, and wherein the exciting and driving coils are concentrically disposed relative to each other and with their common center below the resting point of the pendulum. Furthermore, the exciting coil is D.C.-short-circuited via a highly blocking diode connected with the emitter or the positive pole of the current source and the base of the transistor.

The invention will be more fully appreciated upon the following detailed description of the accompanying drawings, wherein FIGURE 1 is a schematic view of the impelling system for the electronic pendulum clock of the present invention;

FIGURE 2 is a schematic view of the impelling system for an electronic rotary pendulum clock of the invention;

FIGURE 3 is a wiring diagram of the impelling system for an electronic pendulum clock of the present invention;

FIGURE 4 is a schematic view in combination with a wiring diagram of the impelling system for an electronic pendulum clock of the present invention;

FIGURE 5 is a wiring diagram of a preferred embodiment of the impelling system for an electronic pendulum clock of the invention.

Turning now to the drawings somewhat more in particular, the driving coil 1 and the exciting coil 2 are disposed concentrically with respect to each other, the interior coil 1 being the driving coil and the exterior coil 2 being the exciting coil. The two coils are disposed below the plate 4 of the electronic pendulum clock in the foot of the clock and are therefore not visible. The center of the two coils is situated exactly below the vertically disposed pendulum 5 or below the center of the rotary pendulum 5a with regard to the resting position of the latter; the concentric axis of the coils is in alignment with the longitudinal axis of the pendulum 5 or the longitudinal axis of rotation of the rotary pendulum 5a while the pendulum 5 or 5a is at rest. At the lowermost end of the pendulum 5 or in the center of the rotary pendulum 5a there is provided the permanent magnet 3 which contrary to known constructions is so disposed that its respective poles are located parallel to the respective longitudinal axes of the pendulum 5 or the rotary pendulum 5a. In the resting position of the pendulum 5 or 5a a north or south pole is disposed directly above the center of the two concentric coils 1 and 2. Furthermore, the external diameter of the permanent magnet 3 is identical to the internal diameter of the exciting coil 2. Consequently, an impulse is produced in the exciting coil 2 as soon as the pendulum 5 or the rotary pendulum 5a leaves its resting position.

The electrical exciter system and circuit suitable for exciting the electric clock is illustrated in FIG. 3. The driver coil 1 is connected in series circuit connection with the exciter coil 2. The exciter coil 2 interconnects the base electrode B and emitter electrode E of transistor 10, the collector circuit C of which includes a battery 7 and the driver coil 2. A diode 11 is connected between the base B of transistor 10 and the positive terminal of the collector circuit C biasing source and short circuiting the exciter coil 2 in one direction. An adjustable resistor 13 is connected in series circuit connection with diode 11.

The device outlined above operates as follows.

In the resting position, the pendulum 5 with its permanent magnet 3 hangs straight down above coils 1 and 2 and no voltage is induced in the exciter coil 2; consequently the emitter base of transistor 10 is biased to zero emitter current and no collector current is drawn from the battery. Thus, only the negligible collector leakage current flows through the driver coil 1. If now the pendulum deflects towards the right, the flux penetrating coil 2 decreases rapidly to zero whereby a negative voltage is induced across coil 2 rendering the base of transistor 10 negative with respect to the emitter. The emitter current thus opens the collector path and the collector current flows through the driver coil 1. It is to be observed that the collector current flows only after the voltage induced in coil 2 exceeded a certain minimum magnitude which is about 0.1 volts. The two coils 1 and 2 are magnetically coupled through the permanent magnet 3, thus giving cause to a feed-back effect which in turn means that these two coils together with the transistor and the battery form a free running oscillator. During the opening of the emitter-base path of transistor 10, a plurality of oscillations are set up in the driver coil 1. The frequency of this oscillation amounts to about 1000 to 10000 c.p.s. and thus is substantially above the frequency of the pendulum. Without additional means, such as the diode 11, this oscillator would run freely regardless of any further movement of the permanent magnet 13. This is true even though only uni-directional half waves of these oscillations appear in the driver coil, having a direction positive with respect to the emitter. These oscillations are initiated only during negative half waves of the voltage induced in the exciter coil 2. The positive oscillation pulses as they are appearing simultaneously in the driver coil produce a magnetic field only in one direction which repels the permanent magnet 3 and thus increases the deflection of the pendulum. At a predetermined time the pendulum with the permanent magnet 3 returns and builds up again a flux in the exciter coil 2. The voltage induced thereby renders the base of transistor 10 more positive with respect to the emitter and thus causes cut-off of the collector current. The diode 11, however, short-circuits the positive base voltage and brings the effective direct current resistance of the exciter coil to zero in this direction. Therefore, the oscillator is cut off at any time the base tends to become positive with respect to the emitter. This in turn means that the oscillations produced in the exciter coil driver coil system are strongly dampened and the oscillator does not run freely any more because it is an effect present blocking oscillator due to the action of diode 11. Although the magnet 3 enters again into the effective area of the exciter coil, oscillations of the transistor system are effectively prevented and the collector current is cut off until the magnet 3 hangs directly above the center line of the coils 1 and 2. The permanent magnet 3 now, of course, continues to move for a deflection toward the left giving rise to the inducement of another negative pulse in exciter coil 2 which in turn produces another set of oscillations in driver coil 1. Consequently, another repelling field is induced by driver coil 2 and the magnet 3 is pushed towards the left. Upon returning of magnet 3 the exciter coil again induces a positive voltage on the base of a transistor 10 which again is short-circuited and the oscillations disappear in driver coil 1. As it can be seen from the foregoing, during each complete cycle of the pendulum, two repelling pulses are exerted thereupon.

It will be of particular advantage to insert an adjustable resistance 13 into the diode circuit for exactly controlling the bias voltage of the base. This makes it possible to exactly adjust the closed circuit current to zero and also to control the intensity of the exciting impulse. In view of the fact that the intensity of the exciting impulse conditions the amplitude and the number of the oscillations the resistance 13 can be used to adjust the accuracy of operation of the clock. The short-circuiting of the D.C. resistance of the exciting coil will also result in a perfect temperature compensation of the transistor, as the emitter and base voltages are identical or the base voltage is even higher than the emitter voltage.

The impelling system of the present invention is also applicable to pendulum or rotary pendulum clocks of comparatively great size. If the transistor 10 shown in FIGURES 3 and 4 is not sufficient to impel the pendulum a system can be used as shown in FIGURE 5. In addition to a first transistor 10a a second, power transistor 15 is added. The first transistor 10a is connected in the same manner as is transistor 10 in FIGURE 3; there are again two coils 1a, 2a, a battery 7a, a highly blocking diode 11a and an adjustable resistance 13a. The second transistor 15 is connected with its base directly to the emitter E of the first transistor 10a. The variations in voltage at the emitter correspond to the exciting impulses and so control the power transistor 15. The driving coil 16 or several driving coils are inserted in the collector circuit C of the power transistor. The closed circuit current is zero while the exciting impulse is amplified by the transistors and the driving impulse of the necessary intensity is obtained.

It is also possible to provide means enabling a self-starting operation of the pendulum clock. These means may consist of a small permanent magnet 17 constituting the core of the concentric coils 1 and 2. The polarity of this small magnet 17 is so adapted that a small repelling force is exercised upon the magnet 3 in the pendulum. This small repelling force is sufficient to move the pendulum from its resting position and the movement of the pendulum immediately creates an impulse in the exciting coil and thereby the operation of the clock is started.

The impelling system for electronic pendulum clocks of the present invention offers considerable advantages compared with the known constructions. Contrary to the known art the pendulum is impelled in both directions of its movement and thereby the clock operates with a finely adjusted accuracy which was heretofore unknown.

The permanent magnet 3 can be provided in any pendulum so as to be invisible. Since the entire coil combination is composed in the foot of the clock casing 6 it is also invisible and it is possible to employ casings of a particularly pleasant design. Furthermore, the supply wires can also be provided below the foot of the clock and the clock is therefore easy to repair. The entire mechanical works 8 with the dial 9 and the pendulum 5 or 5a with the magnet 3 can therefore be removed with the coils and the electric supply wires below the plate 4 remaining undisturbed. The power source can also be disposed below the plate 4.

A permanent current is non-existent and the only load applied to the power source is the small impulses used for the exciting coil. Consequently, a much smaller power source can be used than in known constructions. Instead of a dry cell battery a very small accumulator can be used in combination with a recharging circuit.

It will be understood that this invention is susceptible to modification in order to adapt it to different usages and conditions, and, accordingly, it is desired to comprehend such modifications within this invention as may fall within the scope of the appended claims.

What I claim is:

1. In an electronic clock, an impelling system comprising: a pendulum, a permanent magnet provided in the lower portion of said pendulum with its respective poles extending in the direction of the longitudinal axis of said pendulum, an exciting coil, a driving coil disposed inside of and concentric with said exciting coil, said exciting coil and said driving coil being located below said permanent magnet with their common axis being in alignment with the longitudinal axis of said pendulum while the latter is at rest; a D.C. voltage source; a transistor having base, emitter, and collector electrodes, said exciting coil being interconnected to said base and said emitter electrode; means for completing a series circuit connection of said voltage source, said driving coil and the emitter-collector path of said transistor; and a rectifying diode connected in parallel to the base-emitter circuit and of a forward direction opposite to the forward direction of the emitter electrode.

2. In an electronic clock, an impelling system comprising a pendulum, a permanent magnet provided in the lower portion of said pendulum with its respective poles extending in the direction of the longitudinal axis of said pendulum, an exciting coil, a driving coil disposed inside of and concentric with said exciting coil, said exciting coil and said driving coil being located below said permanent magnet with their common axis being in alignment with the longitudinal axis of said pendulum while the latter is at rest; a D.C. voltage source, a transistor having base, emitter and collector electrodes, said base and emitter electrodes being connected to one of said coils, the emitter-collector path of said transistor being connected to one of said coils and to said D.C. voltage source, a highly blocking diode having two electrodes and being connected with one electrode to said base at such a polarity so as to block base current therefrom, said diode being connected with the other one of its electrodes to said D.C. voltage source so as to reversely bias said diode.

3. In an electronic clock, an impelling system comprising, a rotary pendulum, a permanent magnet provided in the lower portion of said pendulum with its respective poles extending in the direction of the longitudinal axis of rotation of said rotary pendulum, an exciting coil, a driving coil disposed inside of and concentric with said exciting coil, said exciting coil and said driving coil being located below said permanent magnet with their common axis being in alignment with the longitudinal axis of rotation of said rotary pendulum while the latter is at rest, a D.C. voltage source; a transistor having base, emitter and collector electrodes, said exciting coil being connected to said base and said emitter electrode, means for completing a series circuit connection of said voltage source, said driving coil and the emitter-collector path of said transmitter; a highly blocking diode likewise connected to said emitter and base electrodes at such a polarity opposite to the direction of the current in said base electrode.

4. In an electronic clock, an impelling system comprising a D.C. voltage source, a pendulum, a permanent magnet provided in the lower portion of said pendulum with its respective poles extending in the direction of the longitudinal axis of said pendulum, an exciting coil, a driving coil disposed inside of and concentric with said exciting coil, said exciting coil and said driving coil being located below said permanent magnet with their common axis being in alignment with the longitudinal axis of said pendulum while the latter is at rest, a first transistor having base, emitter, and collector electrodes, said base and emitter electrodes being connected to said exciting coil, a second power transistor also having base, emitter and collector electrodes and being connected with its base to the emitter of said first transistor, said driving coil interconnecting the collector of said power transistor and one pole of said voltage source, the collector of said first transistor being also connected to that pole, means for connecting the emitter electrodes of said transistors to the other pole of said voltage source, and a highly blocking diode connected between the base electrode of said first transistor and the last mentioned pole of said voltage source and a direction reverse to the base-current direction.

5. In an electronic clock as described in claim 2, there being a clock casing with a base plate, said pendulum being suspended in said clock casing above said base plate, said exciting coil and said driving coil being located below said plate.

6. In an electronic clock, an impelling system as described in claim 2, with the internal diameter of said exciting coil being identical to the external diameter of said permanent magnet.

7. In an electronic clock, an impelling system as described in claim 2, further comprising an adjustable resistance connected to said diode.

8. In an electronic clock, an impelling system as described in claim 2, further comprising a permanent magnet core forming the core of said exciting and driving coils.

9. In an electronic clock, the combination which comprises: a pendulum, a permanent magnet provided in the lower portion of said pendulum with its respective poles extending in the direction of the longitudinal axis of said pendulum, an exciting coil, and a driving coil disposed inside of and concentric with said exciting coil, said exciting and driving coils being located below said permanent magnet with the common axis of said coils being in alignment with the longitudinal axis of said pendulum while the latter is at rest.

References Cited in the file of this patent

UNITED STATES PATENTS

| 2,810,083 | Dunay | Oct. 15, 1957 |
| 2,857,518 | Reed | Oct. 21, 1958 |
| 2,895,081 | Crownwer | July 14, 1959 |
| 2,957,116 | Hurd | Oct. 18, 1960 |
| 2,965,806 | Jansen | Dec. 20, 1960 |
| 2,971,323 | Hetzel | Feb. 14, 1961 |
| 2,974,265 | Thoma | Mar. 7, 1961 |

FOREIGN PATENTS

| 59,834 | France | Feb. 24, 1954 |
| 1,092,411 | France | Nov. 10, 1954 |
| 1,153,306 | France | Sept. 30, 1957 |